April 30, 1963 W. F. KING 3,087,357
BALANCING MEANS
Filed Sept. 15, 1954 3 Sheets-Sheet 1
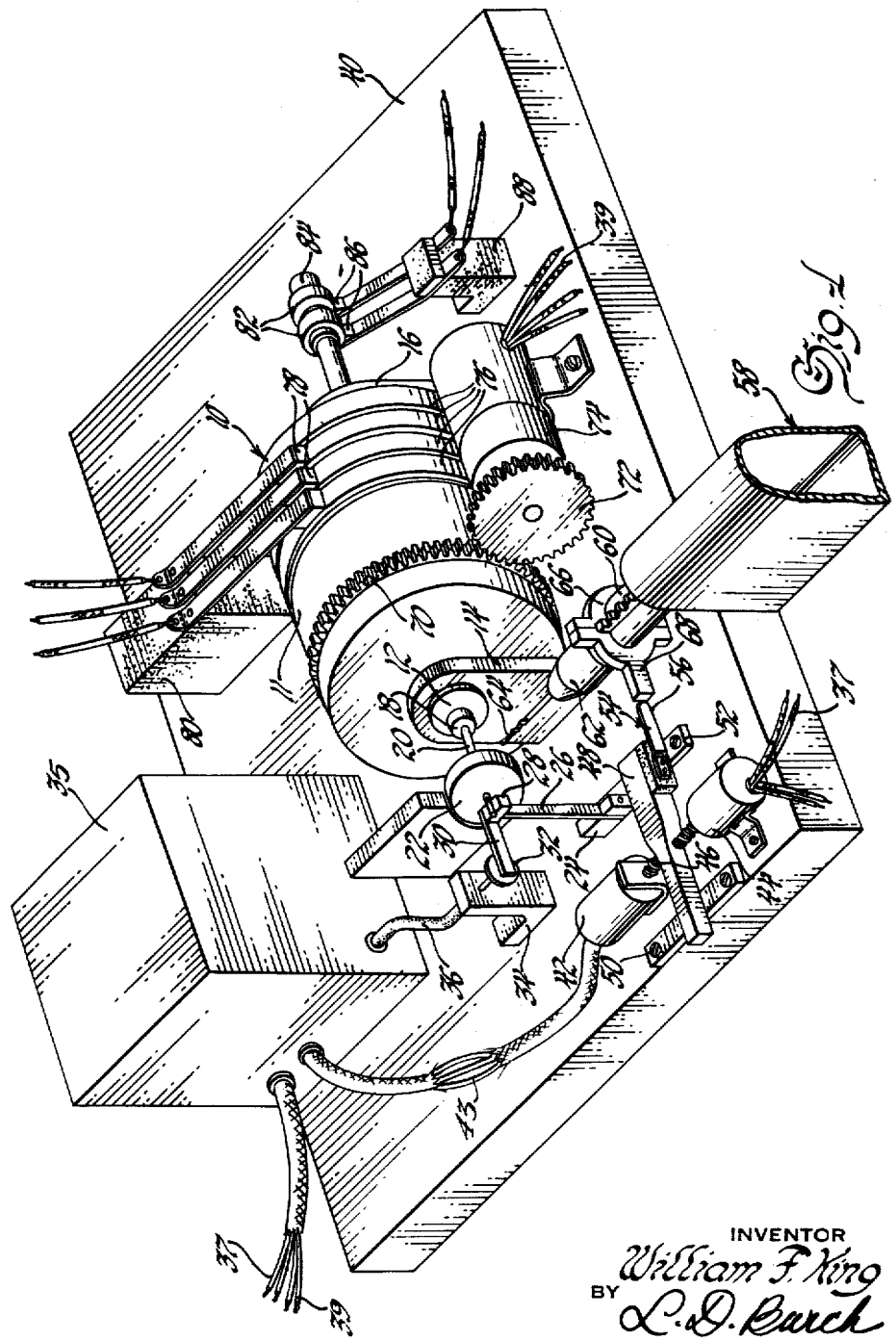
INVENTOR
William F. King
BY
L. D. Burch
ATTORNEY

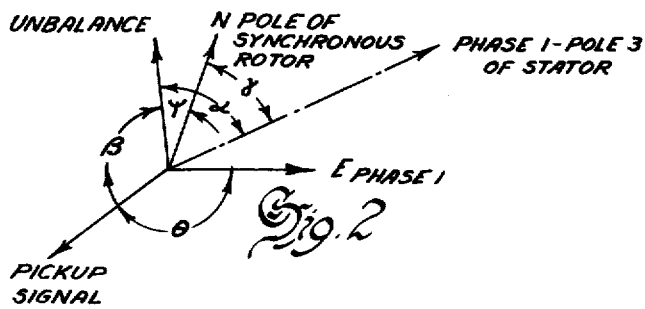
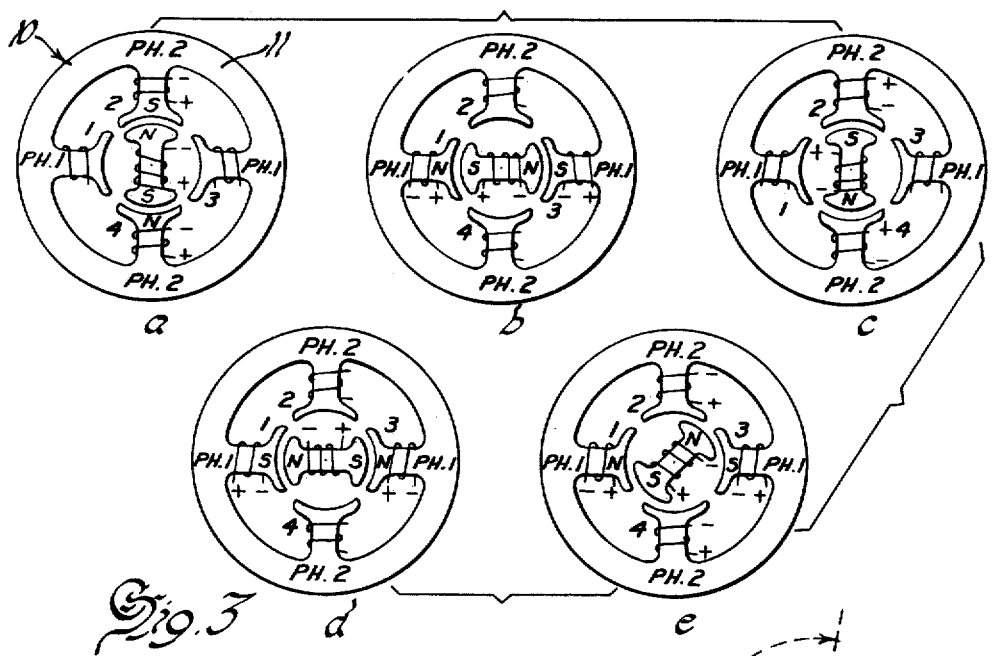
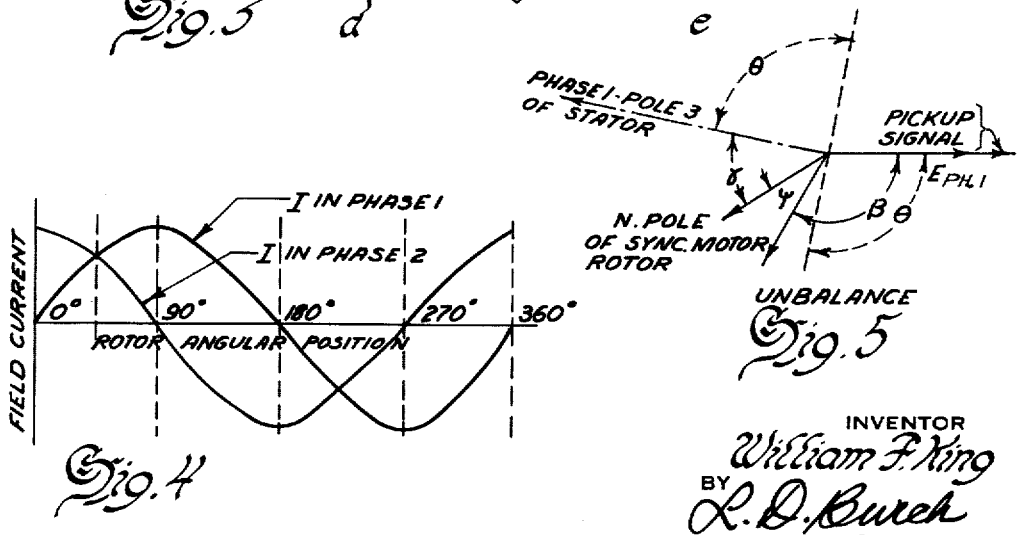

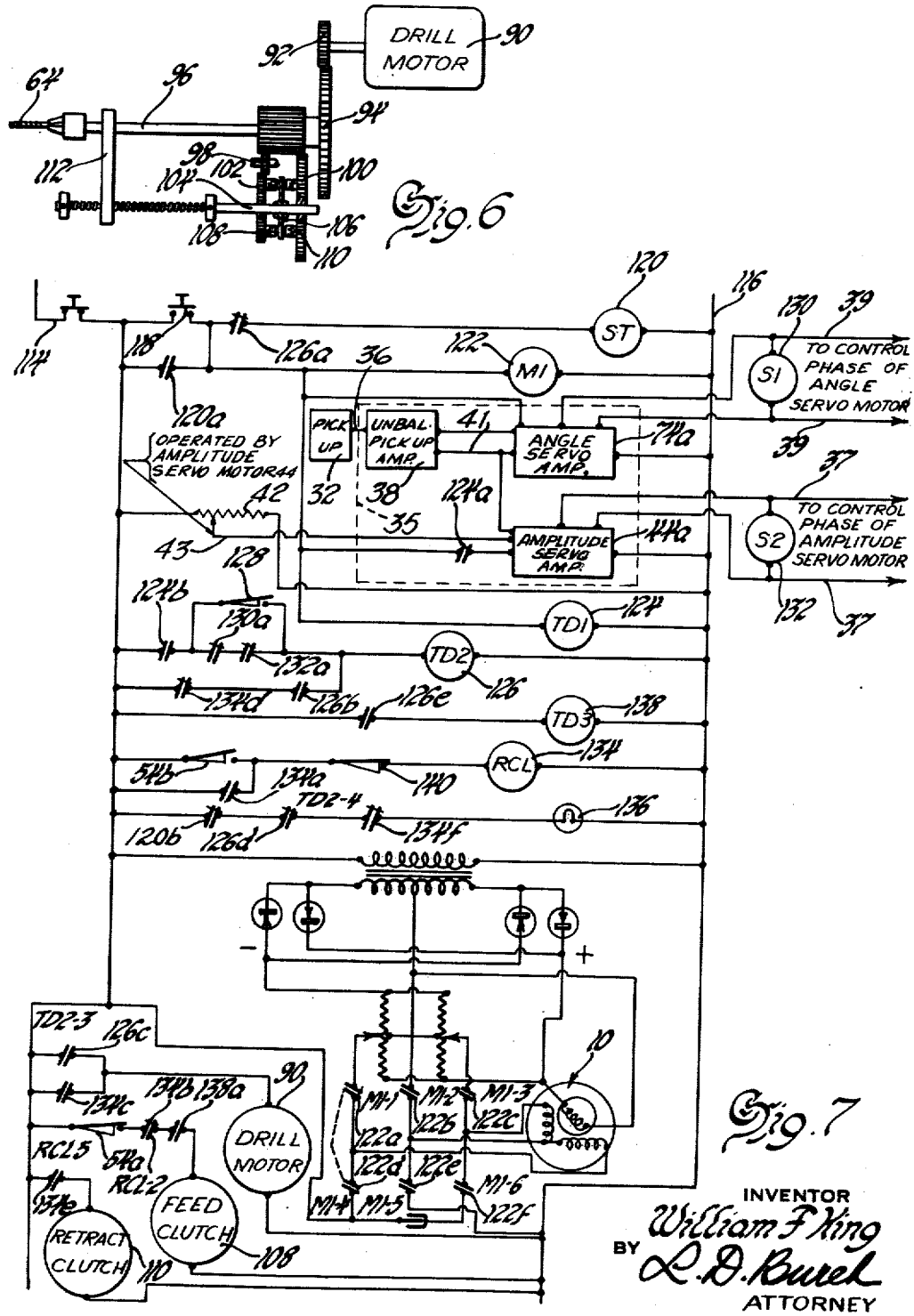

United States Patent Office 3,087,357
Patented Apr. 30, 1963

3,087,357
BALANCING MEANS
William F. King, Birmingham, Mich., assignor to General Motors Corporation, Detroit, Mich., a corporation of Delaware
Filed Sept. 15, 1954, Ser. No. 456,089
17 Claims. (Cl. 77—5)

This invention relates to balancing machines in general and more particularly to dynamic balancing machines wherein a workpiece may be automatically balanced and corrected.

Numerous means have been employed in the past for balancing rotary members and which have included means for marking the workpiece or indicating by dial or gauge means the amount and angular position of unbalance. Generally a separate corrective machine or device has been employed to use such information to bring the workpiece into balance. Those machines which have been adapted to accomplish the balance and corrective steps in a single machine have not been entirely acceptable due to their cost, intricacies of construction making repair and operation more difficult and due to the time necessary to perform a balance, correction and inspection cycle on a single machine.

It is now proposed to provide a machine which will dynamically balance a workpiece by correcting and rechecking the workpiece in a limited period of time. Such a machine is adapted to ascertain the amount and angular disposition of unbalance, to position the unbalance portion of such workpiece for correction and to make the necessary corrections thereto to overcome the dynamic unbalance. A second balance operation may be performed to affirm proper balance or may be dispensed with. Little time is lost in the re-balance operation if such a re-balance is advisable. The proposed balancing machine is further adapted to be simple in construction employing the relative disposition of rotor polarity and field windings of a wound rotor motor to ascertain the angular location of unbalance and to reposition the workpiece for correction. Other units of the proposed machine are basic components, mechanically and electrically interconnected to automatically determine the amount of unbalance and to limit the travel of the corrective means to that required to attain proper balance. The proposed machine makes use of the definite angular relationship between pertinent voltage vectors, rotating parts, and the stator assembly of a synchronous motor during the rotational cycle of the workpiece, as hereinafter described.

In the drawings:

FIGURE 1 is a diagrammatic perspective representation of the proposed dynamic balancer.

FIGURE 2 is a vectorial representation showing the definite angular relationships between pertinent rotational, stationary, and reference signals at a specific time in the rotational cycle of the workpiece.

FIGURE 3, which includes illustrations a to e, is a diagrammatic representation of various alignment positions of the rotor and stator poles of the synchronous motor herein employed.

FIGURE 4 is a curve of relative currents in phases one and two of the drive motor as compared to the angular position of the rotor member.

FIGURE 5 is a vectorial representation of the angular disposition of pertinent vectors similar to FIGURE 2 after the synchronous motor field structure is shifted to align the reference and pick-up signals.

FIGURE 6 is an adaptable drill feed and retraction arrangement.

FIGURE 7 is an electrical circuit wiring diagram of the proposed automatic balancing machine.

The diagrammatic layout of FIGURE 1 shows the proposed balancing system to include a polyphase synchronous drive and positioning motor 10 which is supported within trunnion bearings 12 disposed within trunnion supports 14 and 16. The motor 10 is thus itself rotatably mounted which permits the outer motor casing and field assembly 11 to be rotated to any desired position. A drive chuck 18 is connected to the end of the motor drive shaft and is adapted to receive a flexible spindle 20 upon a workpiece is adapted to be received. The nature of the workpiece, whether it is cylindrical, annular, semi-spherical or otherwise, will of course determine the manner in which the workpiece is secured to the flexible spindle 20. In the present instance for reasons of simplification a cylindrical rotary workpece 22 is shown. The outer end of the flexible spindle 20 is supported upon a flexible support 24 which includes a flat spring member 26 having a bearing block 28 secured to its upper end and arranged to dispose the spindle axis in substantial alignment with the axis of the drive chuck 18. The bearing block 28 has a condenser plate 30 attached thereto which is disposed in close spaced parallel relation to another condenser plate 32 which is supported by an insulated block 34. The condenser plate 32 is connected by lead 36 to the condenser plate pick-up oscillator detector unit 38 (FIGURE 7) within a control box 35. The condenser plate 30 connects to the detector unit 38 through the metallic base 40 of the machine. Conductor group leads 37 and 39 from the detector unit 38 within box 35 are connected from the respective outputs of a pair of conventional servo amplifiers 44a and 74a (FIG. 7), which may be contained within the cabinet housing unit 35, to the control phase windings of a pair of servo motors 44 and 74, as hereafter described. The condenser plate type pick-up is shown for illustration purposes only. Any other suitable vibration sensitive pick-up means which will not add appreciable mass or restraint to the flexible support 24 may be used.

An amplitude determinative potentiometer 42 is secured to base 40 and is directly coupled to an unbalance servo motor 44 by a feed screw 46. The unbalance servo motor 44 has a built in gear reduction to permit close adjustments of the potentiometer 42. A travel arm 48 is threaded on the feed screw 46 and is adapted for transverse travel along guide blocks 50 and 52. A limit switch 54 secured to the travel arm 48 and including an extended contact arm 56 is adapted to be positioned in the course of setting up the potentiometer 42 a determinative amount such as will control the balance correction operation. Such correction in the present instance is by a drill press means 58 including a drill feed rack 60 with chuck 62, drill bit 64 and a collar 66 with a stop lug 68 formed thereon. The drill press when placed in operation is adapted to move the drill bit 64 in on the workpiece 22 to make balance correction until the lug 68 engages contact arm 56 of actuating limit switch 54 which is adapted to effect withdrawal of the drill bit by conventional and well known electrical control means.

The drive and positioning motor 10 in the present instance includes a circular gear tooth section 70 formed therearound which is engaged by a pinion gear 72 of the phase sensitive servo motor 74. The motor 10 is also shown as including external field slip rings 76 engaged by brushes 78 supported by insulated post 80. Slip rings 82 are provided on the armature shaft 84 and are engaged by brushes 86 supported by insulated post 88.

In operation, the rotation of the workpiece 22 by drive motor 10 upon the flexible spindle 20 will cause the centrifugal force due to any unbalance to flex the spring member 26 which in turn will cause variation in the spacing of condenser plates 30 and 32. The condenser plate spacing variation will be cyclic and in direct relation to each revolution of the workpiece 22. The amplitude of the cyclic variation of spacing between condenser plates 30 and 32 will be proportional to the unbalance of workpiece 22. Such cyclic variation in condenser plate spacing further effects a cyclic variation in capacitance between plates 30 and 32 which is received by oscillator detector unit 38 and converted to an alternating voltage output. The alternating voltage output of condenser detector 38 will be proportional in amplitude to the amount of unbalance in the workpiece 22 and will have a constant phase relationship $\beta$ (beta) with the angular location of the unbalance as the drive motor rotor or armature rotates.

The workpiece 22 is rotated synchronously with the electrical supply line frequency; 3600 r.p.m. for 60 cycle supply, 1500 r.p.m. for 25 cycle supply, etc. The unbalance signal generated by the condenser type pick-up will then be of the same frequency as the power supply line and of a phase determined by the location of the unbalance in the workpiece 22. Referring now to FIGURE 2, the time at which the 60 cycle voltage passes through its positive maximum will be called time $t$ which occurs once in each revolution of the synchronous motor armature or rotor having the workpiece 22 associated therewith. At the time $t$ there is a definite angular relationship $\gamma$ (gamma) between the rotor or armature of the motor 10 and the motor frame or casing 11 including the field windings; reference FIGURE 3e using one field pole as a reference point. At the same time $t$ there is a mechanical angular relationship $\psi$ (psi) which is unknown between the synchronous rotor and the unbalanced workpiece 22. Hence, at time $t$ there is additively an angular relationship $\alpha$ (alpha) between the synchronous motor field winding reference pole and the unbalance in the work piece. There is also a definite angular relationship $\beta$ between the plane of pick-up action and the unbalance in workpiece 22 when the unbalance pick-up signal passes through its positive maximum. The plane of pick-up action is that plane which passes through the axis of the workpiece. The angle $\beta$ is dependent upon the rotational speed and natural frequency of the workpiece on the elastic support 24. The unbalance and the pickup signal will have the same phase relationship $\beta$ as long as the work piece is rotated at the same preselected speed. There remains a definite phase angle $\theta$ (theta) between the reference phase voltage $E_{PHI}$ and the unbalance pick-up signal since both are voltages of the same frequency.

If the synchronous motor field structure is shifted by the angle $\theta$ in the proper direction, the unbalance signal voltage will be in phase with the reference voltage as shown vectorally in FIGURE 5. At the time $t$ there is then a definite angular relationship $\beta$ between the plane of pick-up action and the unbalance in the workpiece which angle may be measured from the time the unbalance signal passes through its positive maximum since the aforesaid shifting of the field windings by the angle $\theta$ has brought the pick-up and reference signals into phase.

Employing these principles, the unbalance signal in lead 41 of FIGURE 7 from the pick-up unit 38 is amplified in the phase sensitive servo amplifier 74a and is connected by conductor group leads 39 to one phase of the angle servo motor 74 which angularly positions the casing 11 of the synchronous motor 10 through gears 70 and 72. The other phase of the servo motor 74 is excited from the electrical power supply line. Any difference in phase between the pick-up and reference signals will cause servo motor 74 to rotate the casing of motor 10 until the unbalance pick-up signal is in phase with the reference phase of the electrical power supply line. The output of the phase sensitive servo amplifier 74a is then zero and the motor casing 11 will stop rotating.

The unbalance pick-up signal is now in phase with the power supply line or reference voltage signal and can be measured for amplitude. A portion of the unbalance pick-up signal in lead 41 is opposed by a variable voltage from the power supply line. The amount of power supply line voltage used to oppose the unbalance pick-up signal is varied in lead 43 by the potentiometer 42. The difference in voltage between the unbalance signal in lead 41 and the potentiometer controlled fraction of line supply voltage in lead 43 is introduced through servo amplifier 44a (FIG. 7) to the unbalance servo motor 44 through leads 37. The unbalance servo motor 44 then adjusts the amplitude determinative potentiometer 42 until a voltage equal to the fraction of unbalance pick-up signal is obtained. The servo system is then in balance.

While the amplitude determinative potentiometer 42 is being balanced, the unbalance servo motor 44 also positions the limit switch contact arm 56 by means of feed screw 46. Thus the depth of drill bite is set since the forward motion of the drill bit 64 will be limited by engagement of stop lug 68 with the limit switch contact arm 56.

The rotor of the polyphase synchronous drive and positioning motor 10 is a wound rotor as shown in FIGURE 3. The wound rotor is excited by direct current by means of brushes 78 and slip rings 76 so that it will lock in synchronism with the stator field excited by alternating current at only one position. Upon completion of the unbalance amplitude determination and the setting of the drill stop means a relay signals the end of the balance cycle and the line frequency excitation is cut off from the field windings of the synchronous drive motor. When the synchronous motor is stopped there will still be direct current flowing through the rotor. The rotor is thus in effect an electromagnet. If direct current is then passed through one phase of the polyphase motor as in FIGURE 3a (the motor here being shown as a two phase motor), this phase also becomes an electromagnet and the rotor will align itself accordingly. The direct current so applied to the field windings will also brake the rotor to a stop in attempting to position it. In FIGURES 3b–3e are shown various other possible rotor positions. Any rotor alignment is obtainable by merely properly proportioning the current through the field coils, as shown in FIGURE 4.

To attain the proper distribution of direct current to the field windings which will dispose the rotor in a manner such as will place the unbalance of the workpiece opposite the corrective means, it is necessary in setting up the system for any particular type of workpiece to first perform a set-up operation. This includes using a workpiece which has been balanced by trial and error or other means and deliberately unbalancing the workpiece at a known position. Such workpiece is placed in the balancing machine and taken through a normal cycle in which the synchronous motor stator assembly is automatically positioned by the phase servo motor 74 to the mechanical position where the unbalance pick-up signal is in phase with the line supply to the servo motor. The alternating current is then cut off from the synchronous motor 10 which will then cause the rotor to stop. When the rotor has stopped the direct current through each phase of the synchronous motor field windings is adjusted manually so that the unbalance is in line with the correction means, here the drill. All subsequent workpieces of the same type may then be balanced without further field current adjustment. Thereafter the phase servo motor 74 in seeking a balanced phase relation between the unbalance and reference signals will dispose the field windings of the casing 11 upon which it acts so that direct current excitation of such windings in the proportioned amounts, as previously determined, will align the rotor so as to dispose the unbalanced portion of the workpiece opposite the corrective means.

After a suitable interval to permit stopping and positioning of the workpiece, the drill bit 64 is automatically advanced toward the workpiece to make correction to the extent dictated by the limit switch 54 as set during the balancing cycle.

An adaptable drill feed and retract means is shown in FIGURE 6. The drill motor 90 includes drive gear 92 engaging the drill driving gear 94. Rotation of the drill shank 96 by gear 94 causes feed and retract gears 98 and 100 respectively to be driven; the latter through reverse drive gear 102. A feed screw shaft 104 is thereby rotated in one direction or the other dependent upon whether clutch plate 106 of the feed screw shaft 104 is engaged with feed clutch 108 or retract clutch 110 of the gears 100 and 98 respectively. The drill bit 64 is moved in or out by means of a cross arm travel nut or bar 112 engaged with the feed screw shaft 104.

To more clearly describe the sequence of events from an electrical rather than mechanical vantage point an adaptable wiring or circuit diagram is presented in FIGURE 7. All relays, coils, contacts, etc. are connected across leads 114 and 116 of a 115 volt 60 cycle standard source of supply. Actuation of start button 118 energizes starter relay coil 120, drive motor relay coil 122, time delay relay coil 124 and angle servo motor 74 through amplifier 74a. Contact 120a, energized by starter relay coil 120, bridges the start button 118 and maintains this circuit energized after the start button is released. Starter relay coil 120 also opens normally closed contact 120b to turn out a cycle completion light 136. Drive motor relay coil 122 opens contacts 122a, 122b, and 122c removing direct current from the field of the synchronous drive motor 10 and closes contacts 122d, 122e, and 122f, applying the 115 volt 60 cycle power supply source to the field of the synchronous drive motor causing the motor to accelerate to, and run at, synchronous speed. The angle servo 74 is then powered to shift the motor case 11 to the proper angular position as previously described. The coil 124 has a time delay of some interval, here one second, after which it closes contacts 124a, and 124b. Contact 124a applying power to the amplitude servo motor 44 which adjusts the amplitude terminating potentiometer 42 as previously described. Contact 124b partially completes the circuit to time delay relay coil 126. Limit switch 128 which is normally open is closed when the unbalanced terminating potentiometer 42 is turned to its maximum voltage position. If an unbalance is present within the workpiece 22 greater than the measuring range of the potentiometer 42 limit switch 128 will close energizing relay coil 126. Absent this condition, relay coils 130 and 132 located across the leads 37 and 39 respectively from the detector unit 38 are energized by the voltage to the respective servo motors 74 and 44. As the servo motors 74 and 44 reach an equilibrium position the output from the detector unit 38 through the servo amplifiers 44a and 74a drops to zero de-energizing coils 130 and 132 which in turn permit the contacts 130a and 132a to return to their normally closed position completing the circuit to time delay relay coil 126 and indicating that angle and amount have been determined. After a short delay of about one second relay coil 126 opens contacts 126a, 126d and closes contacts 126b, 126c, and 126e. Contact 126a upon opening de-energizes coil 120 which opens contact 120a which in turn de-energizes angle and amplitude servos 74 and 44 respectively, de-energizes coil 122 which itself opens contacts 122d, 122e and 122f, removing the 115 volt 60 cycle power from the field of the synchronous drive motor 10. The de-energization of coil 120 also allows contact 120b to close and pre-set the completion lamp circuit. Coil 122 at the same time permits contacts 122a, 122b and 122c to return to their normally closed position, applying direct current to the field of synchronous drive motor 10, braking it to a stop and locating the rotor at the proper angle for correction as previously described.

Contact 126b completes a holding circuit to coil 126 through normally closed relay contact 134d. Contact 126c starts the drill motor 90. Contact 126d opens preventing the signal lamp 136 from indicating a completed cycle. Contact 126e energizes coil 138.

Contact 138a completes the circuit to the drill feed clutch 108 through the normally closed contact 134b and normally closed limit switch contact 54a (part of the limit switch 54 shown in FIGURE 1).

The drill is thus adapted to rotate and to be advanced into the workpiece under power. It continues to advance until the stop lug 68 strikes limit switch 54. Limit switch 54 contains contacts 54a and 54b. Contact 54a is opened stopping the feed of the drill by de-energizing the feed clutch 108. Limit switch 54b energizes coil 134 through the normally closed limit switch 140.

Relay coil 134 closes contacts 134a, 134c and 134e while opening contacts 134b, 134d, and 134f. Contact 134a bridges limit switch contact 54b to maintain relay coil 134 through limit switch 140. Contact 134b opens to keep the feed clutch 108 de-energized. Contact 134c parallels contact 126c to maintain the drill motor 90 in operation. Contact 134d opens de-energizing time delay relay coil 126. Contact 134e closes energizing the drill retracting clutch 110. Contact 134f opens to prevent the signal lamp 136 from indicating a completed cycle.

When contact 134d opens de-energizing coil 126 several re-set operations are performed in preparation for the initiation of the next balancing cycle. Contact 126a returns to its normally closed position in the line of coil 120 ready for the next start. Contact 126b which has been holding coil 126 is opened. Contact 126c to the drill motor 90 is opened leaving the drill only under the control of contact 134c. Contact 126d returns to its normally closed position. Contact 126e opens de-energizing coil 138 which in turn opens contact 138a in the feed clutch line.

When contact 134e is closed it energizes the drill retracting clutch 110 which moves the drill spindle back from the workpiece 22 until striking limit switch 140 which opens the circuit and de-energizes coil 134. Contact 134c opens to stop the drill motor 90. Contact 134e opens to de-energize the retract clutch 110. Contacts 134a, 134b and 134d return to their normal coil de-energizing positions and have no further function until the next balance cycle. Contact 134f returns to its normally closed position and energizes the signal lamp 136 through normally closed contacts 120b and 126d.

I claim:

1. Unbalance detecting means comprising drive means having a rotor for rotating and driving a workpiece and having a movable stator acting as a reaction member for driving said rotor, unbalance pickup means for generating an unbalance signal indicative of the unbalance in said workpiece, means for repositioning said stator as a function of the phase of said signal, means for aligning said rotor in some predetermined fixed relation with said stator when said rotor is not rotating.

2. Unbalance detecting means comprising the combination of a drive motor having a rotor operatively interconnected with said workpiece and a casing that acts as a reaction member for driving said rotor, an unbalance pickup responsive to the vibrations in said workpiece for generating an unbalance signal, means for repositioning said casing as a function of the phase of said unbalance signal, means for aligning said rotor in some predetermined relation with said casing when said rotor is not rotating.

3. Unbalance detecting means comprising a rotor adapted to receive a workpiece for rotation therewith, a reaction member for driving said rotor, means for positioning said rotor in a predetermined fixed relation with respect to said reaction member, unbalance detection means disposed adjacent said workpiece and operatively responsive to any unbalance thereof to generate an unbalance signal, said unbalance detection means being connected to said rotor positioning means and responsive to said signal and effective to actuate said rotor positioning means to relocate and retain said workpiece with the heaviest portion thereof in some predetermined fixed location after an unbalance determination has been completed.

4. Unbalance detecting means comprising a motor having a rotor and a casing including field coil windings for driving said rotor, said rotor being adapted to rotatably drive a workpiece for an unbalance measurement, unbalance detection means disposed adjacent said workpiece and operatively responsive to any unbalance within said workpiece to produce an unbalance signal, said unbalance detection means being operatively interconnected with said motor casing for repositioning said casing and the field coil windings therein in response to the position of any unbalance within said workpiece, said field coil windings being effective to retain said workpiece in a stationary position with the heaviest portion thereof being in some predetermined position after an unbalance determination has been made thereon.

5. A device of the class described comprising a synchronous polyphase motor having a rotatably mounted casing and including a wound rotor adapted to receive a workpiece for rotation therewith, said casing including rotor positioning means, unbalance detection means operatively associated with said workpiece to produce an unbalance signal, phase sensitive comparator means connected to said unbalance detection means and to one phase winding of said synchronous motor, said comparator means including means for automatically rotating said casing until said unbalance signal and the current in said winding are in some predetermined relation, said rotor positioning means being effective after an unbalance determination to place and retain said rotor in a fixed position locating the unbalanced portion thereof in some predetermined fixed location.

6. A device of the class described comprising a drive and positioning motor including a rotatable casing having field coil windings disposed therein, a wound rotor disposed within said windings and being adapted to receive an unbalanced workpiece for rotation therewith, unbalance detecting means disposed adjacent said workpiece, said unbalance detecting means being connected to said motor casing and including phase sensitive means operatively responsive to any unbalance within said workpiece for rotatably positioning said motor casing and field coil windings in automatic accordance therewith, and means for exciting said field coils for stopping said rotor and workpiece rotation as required to dispose the unbalanced portion of said workpiece for correction.

7. A device of the class described comprising a drive and positioning motor including a rotatable casing having field coil windings disposed therein, a rotor disposed within said field coil windings of said motor casing, said rotor being adapted to receive a workpiece in fixed relation thereto for balance rotation, unbalance detection means disposed adjacent said workpiece and operatively responsive to any unbalance within said workpiece, said unbalance detection means being connected to said motor casing for automatically rotating said casing to position said field coil windings in response to any unbalance within said workpiece, and means for braking said rotor and workpiece rotation and for repositioning said workpiece by relocation of said rotor relative to said field coil windings whereby the unbalanced portion of said workpiece will be disposed for correction.

8. Balance detection and correction positioning means comprising a polyphase synchronous drive motor including a rotatable casing having field windings secured thereto and a wound rotor disposed therewithin, said rotor being adapted to receive a workpiece for rotation therewith, unbalance detection means operatively associated with said workpiece and adapted to generate an unbalance signal, phase comparator means receiving said unbalance signal and a reference signal from one phase winding of said polyphase motor, said comparator means including means operatively connected to said motor casing for automatically orienting said field windings to dispose said unbalance and reference signals in phase, and rotor positioning means operative upon completion of the phase positioning operation for orienting said rotor relative to said field windings to retain said workpiece in a fixed position with the unbalance disposed as required for correction.

9. Balance detection and correction positioning means including a rotatably mounted synchronous motor having polyphase field windings and a wound rotor, said rotor being adapted to receive a workpiece for rotation therewith, unbalance detection means operatively associated with said workpiece and adapted to generate unbalance phase and amplitude signals, phase comparative means receptive of said unbalance phase signal and connected to a winding of said polyphase motor initiating a reference phase signal, said phase comparative means repositioning said motor to dispose said reference signal in phase with said unbalance signal, unbalance corrective means operatively connected to said unbalance detection means and responsive to said unbalance amplitude signal for automatically determining the extent of correction required, and means for repositioning said rotor in a predetermined fixed relation to said motor to dispose the unbalance of said workpiece is a definite angular position.

10. An unbalance detection system comprising a synchronous polyphase wound motor rotatably mounted and including a wound rotor adapted to receive a workpiece having an unbalanced portion for rotation therewith, said unbalanced portion of said workpiece having a definite unknown angular relation to the disposition of said rotor, unbalance detection means operatively associated with said workpiece and adapted to generate an unbalance signal, a reference signal received from one winding of said motor, phase sensitive comparator means for receiving and comparing said unbalance and said reference signals and for automatically positioning said motor to dispose said reference signal in phase with said unbalance signal, and means operative upon said rotor for positioning said rotor into a fixed angular disposition with said unbalanced portion of said workpiece located as required for correction thereof.

11. Unbalance detection and corrective positioning means comprising a synchronous polyphase wound motor having a wound rotor adapted to receive an unbalanced member for rotation, unbalance detection means operatively associated with said workpiece and adapted to generate an unbalance signal, a reference signal received from one winding of said motor and of the same frequency as that of said unbalance signal, phase discriminative means receiving said signals and adapted to automatically orient said one winding to dispose said reference signal in phase with said unbalance signal, and means for separately energizing said motor windings after a balance determination to effect a repositioning of said rotor for relocating the unbalanced portion of said workpiece in a predetermined fixed location as required for correction.

12. Unbalance detection and correction positioning means including a synchronous motor having polyphase windings and a wound rotor, said motor including a rotatably mounted casing having said windings therewithin, said rotor being adapted to receive a workpiece having an unbalanced portion for rotation therewith, said unbalanced portion of said workpiece having a fixed unknown angular relationship to one pole of said rotor, unbalance detection means operatively associated with said workpiece and adapted to generate an unbalance signal, a reference signal received from one winding of said motor, said unbalance and reference signals having the same frequency, phase sensitive comparator means receiving said unbalance and said reference signals and being adapted to reposition said one winding by rotation of said motor casing to dispose said reference signal in phase with said unbalance signal, means for locating the angular relation to said rotor in a fixed position with respect to said one winding generating said reference signal, after an unbalance determination to dispose said unbalance portion of said workpiece in a predetermined fixed location as required for correction.

13. Unbalance detection and correction means comprising a synchronous drive motor, said motor including a rotatably mounted casing having field windings therein, a wound rotor disposed within said windings and adapted to receive a workpiece for rotation therewith, said workpiece having an unbalanced portion disposed in fixed piece having an unbalanced portion disposed in fixed unknown angular relation to one pole of said rotor, unbalance detection means and unbalance corrective means disposed in known planes and in fixed relation to each other, said unbalance detection means being operatively associated with said workpiece and adapted to generate an unbalance signal, a reference signal received from one winding of said motor and of the same frequency as said unbalance signal, phase comparator means receiving said unbalance and reference signals and being adapted to reposition said one winding by rotation of said casing to dispose said reference signal in phase with said unbalance signal, amplitude comparator means receiving said unbalance and reference signals and being operatively connected to said unbalance corrective means for automatic control thereof, and means for repositioning said one pole of said rotor relative to said one winding after an unbalance determination for disposing the unbalance portion of said workpiece in a predetermined fixed location adjacent said unbalance corrective means, said pole having a determinable angular relation to said one winding and said one winding having a determinable angular relation to the plane of unbalance detection.

14. In apparatus of the class described having means to measure the amount and angle of unbalance in a rotary workpiece and to correct therefor, means to determine the magnitude of unbalance to be corrected, means to determine the angle of unbalance to be corrected, means to effect simultaneous actuation of both said magnitude and angle determinating means, and unbalance correction means responsive to said unbalance magnitude and angle determining means to correct the workpiece for unbalance.

15. In apparatus of the class described having means to measure the amount and angle of unbalance in a rotary workpiece and to correct therefor, means to determine the magnitude of unbalance to be corrected, means to determine the angle of unbalance to be corrected, means to effect simultaneous actuation of both said magnitude and angle determining means, means to correct for unbalance in the workpiece, means responsive to said angle determining means to index the workpiece relative to said correcting means, and means responsive to said unbalance magnitude determining means to control the amount of correction, said means being automatically operable in correlation following loading of the workpiece into the apparatus and initiation of the measuring and correcting cycle.

16. An automatic balancing machine comprising unbalance measuring apparatus adapted to determine the amount of unbalance and the angular location thereof in a rotary workpiece, unbalance correcting apparatus responsive to said measuring apparatus to effect the needed correction at the angle for maximum unbalance in the workpiece, and means to operate said apparatuses in correlation whereby all of the measuring intelligence is automatically utilized in controlling the correction for each given workpiece.

17. In apparatus of the class described for balancing a rotary workpiece, means to determine the magnitude of unbalance in the workpiece, means to determine the angle of unbalance in the workpiece, means to effect simultaneous actuation of both said magnitude and angle determinating means, and unbalance correction means responsive to said unbalance magnitude and angle determining means to correct the workpiece for unbalance.

References Cited in the file of this patent
UNITED STATES PATENTS

| | | |
|---|---|---|
| 2,048,082 | Riggs | July 21, 1936 |
| 2,123,443 | Taylor | July 12, 1938 |
| 2,131,602 | Thearle | Sept. 27, 1938 |
| 2,331,733 | Senger | Oct. 12, 1943 |
| 2,363,373 | Werner | Nov. 21, 1944 |
| 2,493,670 | Harvey et al. | Jan. 3, 1950 |
| 2,731,887 | Sjostrand | Jan. 24, 1956 |
| 2,821,858 | King | Feb. 4, 1958 |

UNITED STATES PATENT OFFICE
CERTIFICATE OF CORRECTION

Patent No. 3,087,357                      April 30, 1963

William F. King

It is hereby certified that error appears in the above numbered patent requiring correction and that the said Letters Patent should read as corrected below.

Column 2, line 12, after "upon" insert -- which --; column 8, line 28, for "is" read -- in --; column 9, line 14, strike out "piece having an unbalanced portion disposed in fixed".

Signed and sealed this 19th day of November 1963.

(SEAL)
Attest:

ERNEST W. SWIDER                      EDWIN L. REYNOLDS
Attesting Officer                    Acting Commissioner of Patents